United States Patent
Imamura et al.

(10) Patent No.: US 7,944,871 B2
(45) Date of Patent: May 17, 2011

(54) COMMUNICATION RELAY APPARATUS AND COMMUNICATION RELAY METHOD

(75) Inventors: Daichi Imamura, Kanagawa (JP);
Ayako Horiuchi, Kanagawa (JP);
Kenichi Miyoshi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 829 days.

(21) Appl. No.: 11/912,807

(22) PCT Filed: Apr. 26, 2006

(86) PCT No.: PCT/JP2006/308691
§ 371 (c)(1),
(2), (4) Date: Oct. 26, 2007

(87) PCT Pub. No.: WO2006/118125
PCT Pub. Date: Nov. 9, 2006

(65) Prior Publication Data
US 2009/0092072 A1 Apr. 9, 2009

(30) Foreign Application Priority Data
Apr. 28, 2005 (JP) ................... 2005-133720

(51) Int. Cl.
*H04B 7/14* (2006.01)
(52) U.S. Cl. .......................... 370/315; 455/7
(58) Field of Classification Search ............. 370/315; 455/7, 13.1
See application file for complete search history.

(56) References Cited

U.S. PATENT DOCUMENTS

| | | | |
|---|---|---|---|
| 2004/0198467 A1* | 10/2004 | Orlik et al. | 455/574 |
| 2005/0014464 A1* | 1/2005 | Larsson | 455/11.1 |
| 2005/0048914 A1* | 3/2005 | Sartori et al. | 455/11.1 |
| 2005/0190822 A1* | 9/2005 | Fujii et al. | 375/211 |
| 2005/0239457 A1* | 10/2005 | Levin et al. | 455/431 |

FOREIGN PATENT DOCUMENTS

| | | |
|---|---|---|
| JP | 63-132535 | 6/1988 |
| JP | 5-268178 | 10/1993 |
| JP | 07273707 | 10/1995 |
| JP | 9-36793 | 2/1997 |
| JP | 2003-229798 | 8/2003 |

OTHER PUBLICATIONS

International Search Report dated Aug. 3, 2006.
T. Miyano, et al. "Cooperative Relaying Technique with Space Time Block Code for Multihop Communications among Single Antenna Terminals, " Technical Report of IEICE, pp. 71-76, Mar. 2004.

* cited by examiner

Primary Examiner — Brian D Nguyen
(74) Attorney, Agent, or Firm — Dickinson Wright PLLC

(57) ABSTRACT

A communication relay apparatus wherein the error rate characteristic of a relay destination is improved to raise the throughput, while reducing the given interference power to prevent the reduction of the throughput of the whole communication system. In the apparatus, a signal addressed to a base station is received (ST1010), and a decoding process and other processes are performed (ST1020). A bit error determination is performed (ST1030), and if there is no bit error, a reproduction/relay process (ST1050) is performed. If there is any bit error, a threshold-based determination of reception quality is performed for each of subcarriers (ST1120-1130). If the reception quality is greater than a threshold value, the corresponding subcarrier is outputted (ST1140); otherwise, the corresponding subcarrier is not relayed (ST1150). A signal, which has been subjected to either process, is transmitted (ST1060).

13 Claims, 19 Drawing Sheets

| MCS SET NUMBER | MODULATION SCHEME | CODING RATE | TH_m [dB] | TH_r [dB] | SIR APPLYING RANGE [dB] | RELAY DECISION THRESHOLD VALUE[dB] |
|---|---|---|---|---|---|---|
| 5 | 64QAM | R=3/4 | 20 | 18 | 20≦AVERAGE SIR VALUE | 18+β |
| 4 | 16QAM | R=3/4 | 15 | 13 | 15≦AVERAGE SIR VALUE<20 | 13+β |
| 3 | 16QAM | R=1/2 | 13 | 11 | 13≦AVERAGE SIR VALUE<15 | 11+β |
| 2 | QPSK | R=3/4 | 10 | 8 | 10≦AVERAGE SIR VALUE<13 | 8+β |
| 1 | QPSK | R=1/2 | 8 | 6 | 8≦AVERAGE SIR VALUE<10 | 6+β |
| 0 | NOT ALLOCATING | | --- | --- | AVERAGE SIR VALUE<8 | |

FIG.12

16QAM R=3/4, TH_r=13dB

| NUMBER OF RELAY STATIONS THAT PERFORM COOPERATIVE RELAY | OFFSET $\beta$ [dB] | RELAY DECISION THRESHOLD VALUE[dB] |
|---|---|---|
| 1 | --- | --- |
| 2 | + 0 dB | 13 |
| 3 | + 2 dB | 15 |
| 4 | + 4 dB | 17 |
| 5 | + 6 dB | 19 |

FIG.13

| MCS SET NUMBER | MODULATION SCHEME | CODING RATE | TH_m [dB] | TH_r [dB] | TH_h [dB] | SIR APPLYING RANGE [dB] | RELAY DECISION THRESHOLD VALUE[dB] | HARD DECISION THRESHOLD VALUE[dB] |
|---|---|---|---|---|---|---|---|---|
| 5 | 64QAM | R=3/4 | 20 | 18 | 27 | 20≦AVERAGE SIR VALUE | 18+$\beta$ | 27+$\gamma$ |
| 4 | 16QAM | R=3/4 | 15 | 13 | 22 | 15≦AVERAGE SIR VALUE<20 | 13+$\beta$ | 22+$\gamma$ |
| 3 | 16QAM | R=1/2 | 13 | 11 | 20 | 13≦AVERAGE SIR VALUE<15 | 11+$\beta$ | 20+$\gamma$ |
| 2 | QPSK | R=3/4 | 10 | 8 | 17 | 10≦AVERAGE SIR VALUE<13 | 8+$\beta$ | 17+$\gamma$ |
| 1 | QPSK | R=1/2 | 8 | 6 | 15 | 8≦AVERAGE SIR VALUE<10 | 6+$\beta$ | 15+$\gamma$ |
| 0 | NOT ALLOCATING | | --- | --- | --- | AVERAGE SIR VALUE<8 | | |

FIG.18

| CLASSIFICATION NUMEBR | #1 | #2 | #3 |
|---|---|---|---|
| PACKET PROPERTY | PACKET TO WHICH RETRANSMISSION CONTROL SUCH AS ARQ (INCLUDING HARQ) IS NOT APPLIED AND WHERE PACKET ERROR IS NOT TO BE CORRECTED | PACKET HAVING SHORT ALLOWABLE TRANSMISSION DELAY TIME PERIOD | PACKET HAVING SMALL DATA SIZE |
| SPECIFIC EXAMPLE | ·BROADCAST PACKET<br>·MULTICAST PACKET<br>·ACK/NACK PACKET<br>·DATA PACKET SET INAPPLICABLE WITH ARQ<br>·RANDOM ACCESS PACKET (RACH) | ·INTERACTIVE SPEECH PACKET (SUCH AS TELEPHONE AND TV CONFERENCE)<br>·INTERACTIVE VIDEO PACKET (SUCH AS TV CONFERENCE)<br>·PACKET WHICH FAILS TO BE RETRANSMITTED A PLURALITY OF TIMES AND WHICH APPROACHES TIME-OUT OF ALLOWABLE TRANSMISSION DELAY TIME PERIOD | ·PACKET HAVING LARGE OVERHEAD DUE TO RETRANSMISSION |

FIG.23

COMMUNICATION RELAY APPARATUS AND COMMUNICATION RELAY METHOD

TECHNICAL FIELD

The present invention relates to a communication relay apparatus and communication relay method.

BACKGROUND ART

In recent years, with spread of broadband communication services at home, also in a mobile communication system of a cellular scheme, research and development are actively conducted for the purpose of providing high-capacity data communication services. However, radio frequencies which are finite resources are running short, and it is actively studied to utilize high frequency bands and realize a high transmission rate in order to realize high-capacity data transmission.

When high frequency radio bands are utilized, a high transmission rate can be expected in a short distance, but attenuation due to a transmission distance is significant. Therefore, when high frequency radio bands are utilized in a real system, for example, the coverage area of a base station becomes small, and it is necessary to provide more base stations. Providing base stations requires significant costs, and therefore it is strongly desired to suppress an increase in the number of base stations and provide the above communication services.

Therefore, in order to make it possible even for the mobile station located outside a cellular service area to communicate with the base station, it is actively studied to make another mobile station (relay station) located between this mobile station and the base station relay the communication data. By this means, it is possible to realize communication between the mobile station located outside the cellular service area and the base station and practically expand the coverage area of the base station.

For example, Patent Document 1 discloses a radio relay scheme where a transmitting station (source), relay station and receiving station (destination), each perform a hybrid-type relay having both a channel for performing a regenerative relay and a channel for performing a non-regenerative relay. In this scheme, when a regenerative relay is performed, frame error rate performance of the receiving station become optimum.

Further, Non-Patent Document 1 discloses a technique where a plurality of relay stations relay the signals transmitted from a transmitting station and a receiving station combines the received signals which a plurality of relay stations relayed. According to this technique, the receiving station can obtain a space diversity effect by receiving a plurality of relayed signals, so that it is possible to obtain data with high accuracy. This technique is referred to as a cooperative relay scheme.

Patent Document 1: Japanese Patent Application Laid-Open No. HEI7-273707

Non-Patent Document 1: Tsuyoshi MIYANO, and others "Cooperative Relaying Technique with Space Time Block Code for Multihop Communications among Single Antenna Terminals"

DISCLOSURE OF INVENTION

Problems to be Solved by the Invention

However, the technique disclosed in Patent Document 1 has the following problem. That is, with the technique disclosed in Patent Document 1, even in the case of regenerative relay, as well as in the case of non-regenerative relay, when a reception error occurs at the relay station, error rate performance at the receiving station deteriorate and throughput decreases.

Further the technique disclosed in Non-Patent Document 1 has the following problem. That is, although the error rate performance at the receiving station can be improved by increasing the number of relay stations that perform a cooperative relay, under a multi-cell environment such as a mobile communication system, interference power against adjacent cells by the relay stations increases in accordance with an increase in the number of relay stations, and therefore the overall throughput of the communication system decreases.

It is therefore an object of the present invention to provide a communication relay apparatus and communication relay method that make it possible to improve throughput by improving error rate performance at the receiving station and prevent the overall data throughput of the communication system from decreasing by reducing interference power.

Means for Solving the Problem

The communication relay apparatus of the present invention adopts a configuration having: a first determining section that determines received quality of a whole of a received signal comprised of a plurality of elements; a first relay section that relays the whole of the received signal according to the determination result in the first determining section; a second determining section that determines received quality of the received signal per element; and a second relay section that relays a specific element of the received signal according to the determination result in the second determining section.

Advantageous Effect of the Invention

According to the present invention, when communication is relayed among a plurality of communication terminals, it is possible to improve throughput by improving error rate performance at the receiving station and prevent the overall data throughput of the communication system from decreasing by reducing interference power.

BRIEF DESCRIPTION OF DRAWINGS

FIG. 12 shows content of a relay decision threshold value table according to Embodiment 1;

FIG. 13 shows a relationship between the number of relay stations and offset A;

FIG. 18 shows content of a relay decision threshold value table and a hard decision threshold value table according to Embodiment 2;

FIG. 23 shows properties and specific examples of packets classified into type A.

BEST MODE FOR CARRYING OUT THE INVENTION

Embodiments of the present invention will be described in detail below with reference to the accompanying drawings. Here, a case will be described as an example where an OFDM (Orthogonal Frequency Division Multiplex) scheme is adopted as a communication scheme and communication is performed using a plurality of subcarriers.

Embodiment 1

Figure 1:
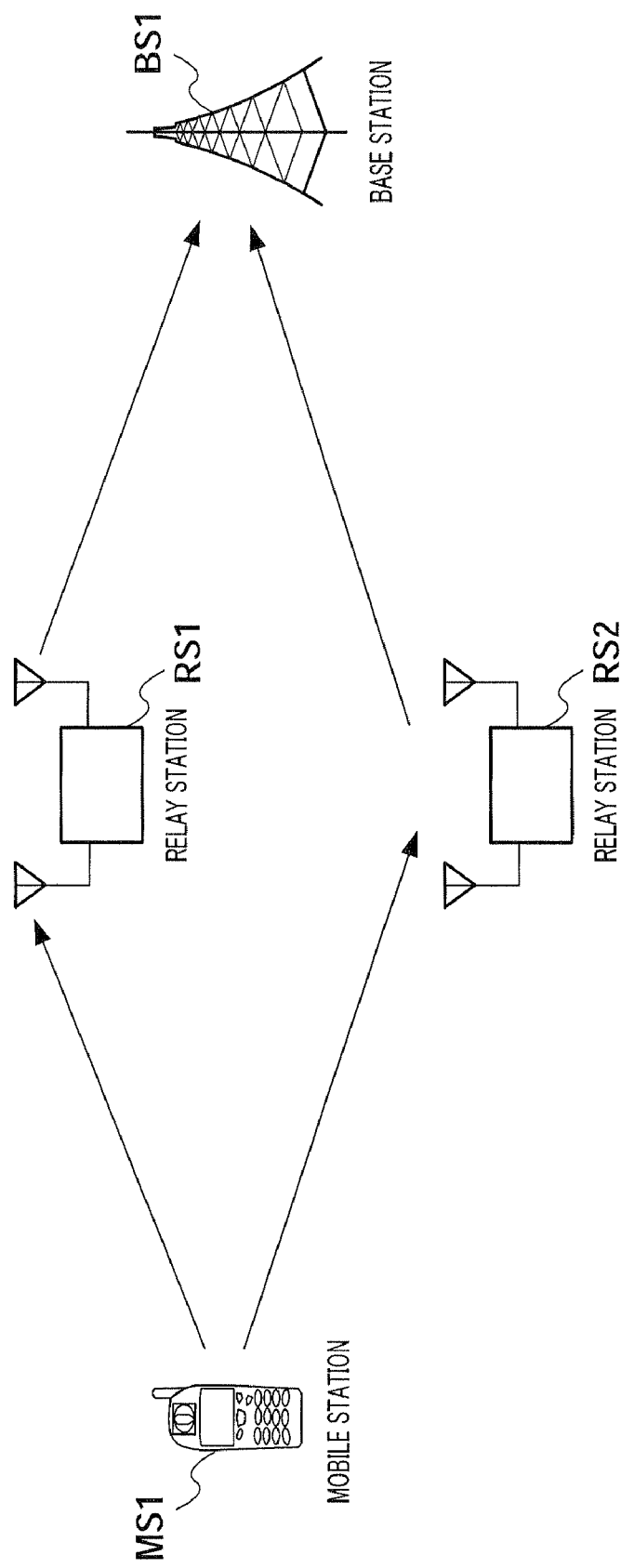
FIG. 1 shows an outline of a communication system according to Embodiment 1.

FIG. 1 shows an outline of the communication system according to Embodiment 1 of the present invention.

This communication system includes mobile station MS1, relay stations RS1 and RS2, and base station BS1, and mobile station MS1 is located outside the cellular service area managed by base station BS1. The user of mobile station MS1 desires to communicate with base station BS1. However, mobile station MS1 is located outside the cellular service area, and therefore is unable to perform communication in this situation. Therefore, in the communication system according to this embodiment, relay station RS1 or relay station RS2 located between mobile station MS1 and base station BS1 is made to relay communication between mobile station MS1 and base station BS1. In addition, for ease of explanation, a case will be described as an example where signals are transmitted from mobile station MS1 to base station BS1, that is, uplink communication (uplink relay).

In the communication system according to this embodiment, mobile station MS1 requests a relay of transmission signals to relay station RS1 and relay station RS2. In response, relay station RS1 and relay station RS2 adopt the following relay method.

Cases where mobile station MS1 that can receive radio waves from base station BS1 requests a relay of transmission signals include the situation where mobile station MS1 cannot directly transmit signals to base station BS1 because the transmission power of mobile station MS1 is lower than the transmission power of base station BS1.

Further, another possible situation is where mobile station MS1 does not directly transmit signals to base station BS1 in order to reduce interference power against adjacent cells which is caused by the signals transmitted from mobile station MS1.

Here, although a case is described as an example where there are two relay stations, RS1 and RS2, three or more relay stations may be provided.

Figure 2:
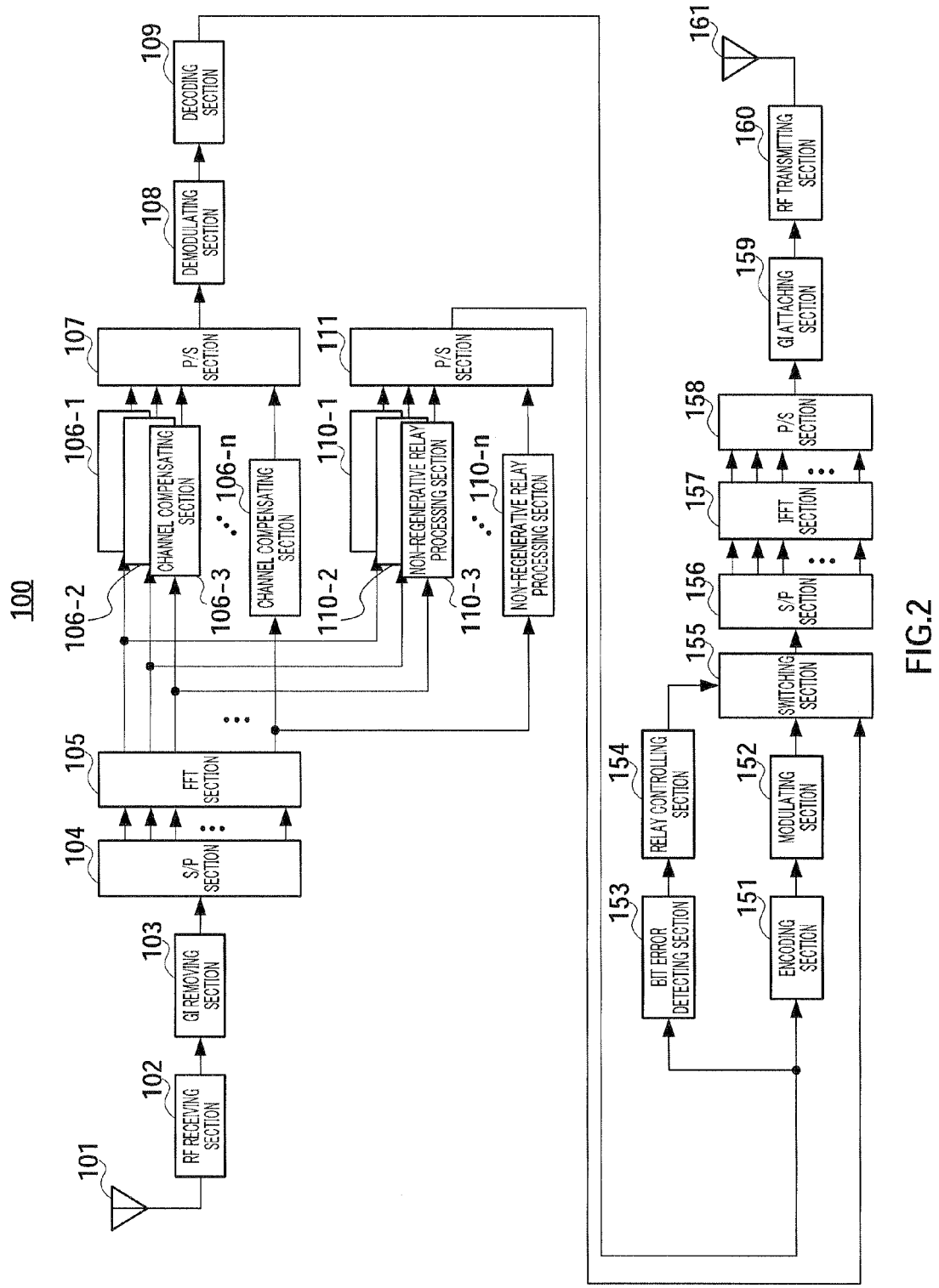
FIG. 2 is a block diagram showing the main internal configuration of a communication relay apparatus according to Embodiment 1.

FIG. 2 is a block diagram showing a specific apparatus configuration of above-described relay station RS1 (or RS2), that is, the main internal configuration of communication relay apparatus 100 according to this embodiment.

This communication relay apparatus 100 is roughly divided into a reception processing circuit and transmission processing circuit, and the sections of the processing circuits perform the following operations. First, the reception processing circuit will be described.

RF receiving section 102 receives a signal from the transmitting station via antenna 101 and performs radio reception processing such as filtering processing, down-conversion and A/D conversion, on this received signal. GI removing section 103 removes the guard interval (GI) part from the OFDM signal (baseband signal) outputted from RF receiving section 102. S/P section 104 performs serial/parallel conversion on the OFDM signal outputted from GI removing section per OFDM symbol. FFT section 105 performs OFDM demodulation processing by means of fast Fourier transform (FFT) on the OFDM signal outputted from S/P section 104, extracts symbol streams of subcarriers from the frequency multiplexed OFDM symbols and outputs the results to channel compensating sections 106-1 to 106-N and non-regenerative relay processing sections 110-1 to 110-n.

A plurality of channel compensating sections 106-1 to 106-N (hereinafter, collectively referred to as simply "106") are provided according to the subcarriers, and compensate for the influence of fading received in the channel per subcarrier, for data symbols of the subcarriers outputted from FFT section 105. To be more specific, channel compensating section 106 compensates for the phase fluctuation alone, or compensates for the amplitude fluctuation and phase fluctuation. P/S section 107 performs parallel/serial conversion per OFDM symbol on the plurality of subcarrier signals outputted from channel compensating section 106. Demodulating section 108 determines (soft decision or hard decision, depending on the algorithm of subsequent decoding section 109) the signal points (constellation) transmitted per symbol outputted from P/S section 107. Decoding section 109 performs error correction processing based on the signal point determination information determined at demodulating section 108, and outputs the bit streams obtained through this processing. The resulting bit streams are a signal obtained by decoding (regenerating) the signal from the transmitting station, and are referred to as a "regenerative relayed signal" with the present invention.

On the other hand, a plurality of non-regenerative relay processing sections 110-1 to 110-n (hereinafter, collectively referred to as simply "110") are provided according to the subcarriers in the same way as channel compensating section 106, perform the determination described later on the data symbols outputted from FFT section 105 per subcarrier, and output relayed signals according to the determination result.

P/S section 111 performs parallel/serial conversion per OFDM symbol on the plurality of subcarrier signals outputted from non-regenerative relay processing section 110 and outputs the results to switching section 155. In addition, the signals outputted from P/S section 111 are from the transmitting station but are not decoded (regenerated). Therefore, with the present invention, these signals are referred to as "non-regenerative relayed signals."

The configuration of the reception processing circuit has been described. Next, the transmission processing circuit will be described.

Encoding section 151 re-encodes the decoded signal outputted from decoding section 109, that is, a signal addressed to base station BS1 and subjected to decoding processing once, using an error correction code such as turbo code, LDPC (Low Density Parity Check) code and convolution code. Modulating section 152 performs re-modulation processing such as QPSK and 16QAM on the encoded signal outputted from encoding section 151 and generates data symbol streams.

On the other hand, bit error detecting section 153 determines (bit error determination) whether or not there is a bit error, using CRC (Cyclic Redundancy Check) for the bit streams subjected to error correction by decoding section 109 and outputs the determination result. In addition, when packet communication is performed in the communication system, bit error detecting section 153 performs packet error determination instead of bit error determination. A packet may be data in frame units or may be other data.

Relay controlling section 154 outputs a control signal based on information reported from bit error detecting section 153 as to whether or not there is a bit error, and controls switching section 155.

Switching section 155 switches between outputting the modulated signal of the regenerative relayed signal outputted from modulating section 152 and outputting the non-regenerative relayed signal outputted from P/S section 111, according to the control signal outputted from relay controlling section 154.

S/P section 156 performs serial/parallel conversion per OFDM symbol on the signal outputted from switching section 155 and divides the OFDM signal into a plurality of symbol streams to be mapped to the subcarriers. IFFT section 157 performs OFDM modulation by means of inverse fast Fourier transform (IFFT) on the symbol streams for each subcarrier outputted from S/P section 156. P/S section 158 performs parallel/serial conversion on the OFDM modulated signal outputted from IFFT section 157. GI attaching section 159 attaches guard intervals (cyclic prefix) to the signal outputted from P/S section 158 and generates OFDM symbols. RF transmitting section 160 performs predetermined radio transmission processing such as quadrature modulation, power amplification and filtering on the OFDM symbols outputted from GI attaching section 159, and transmits the results to antenna 161.

Figure 3:
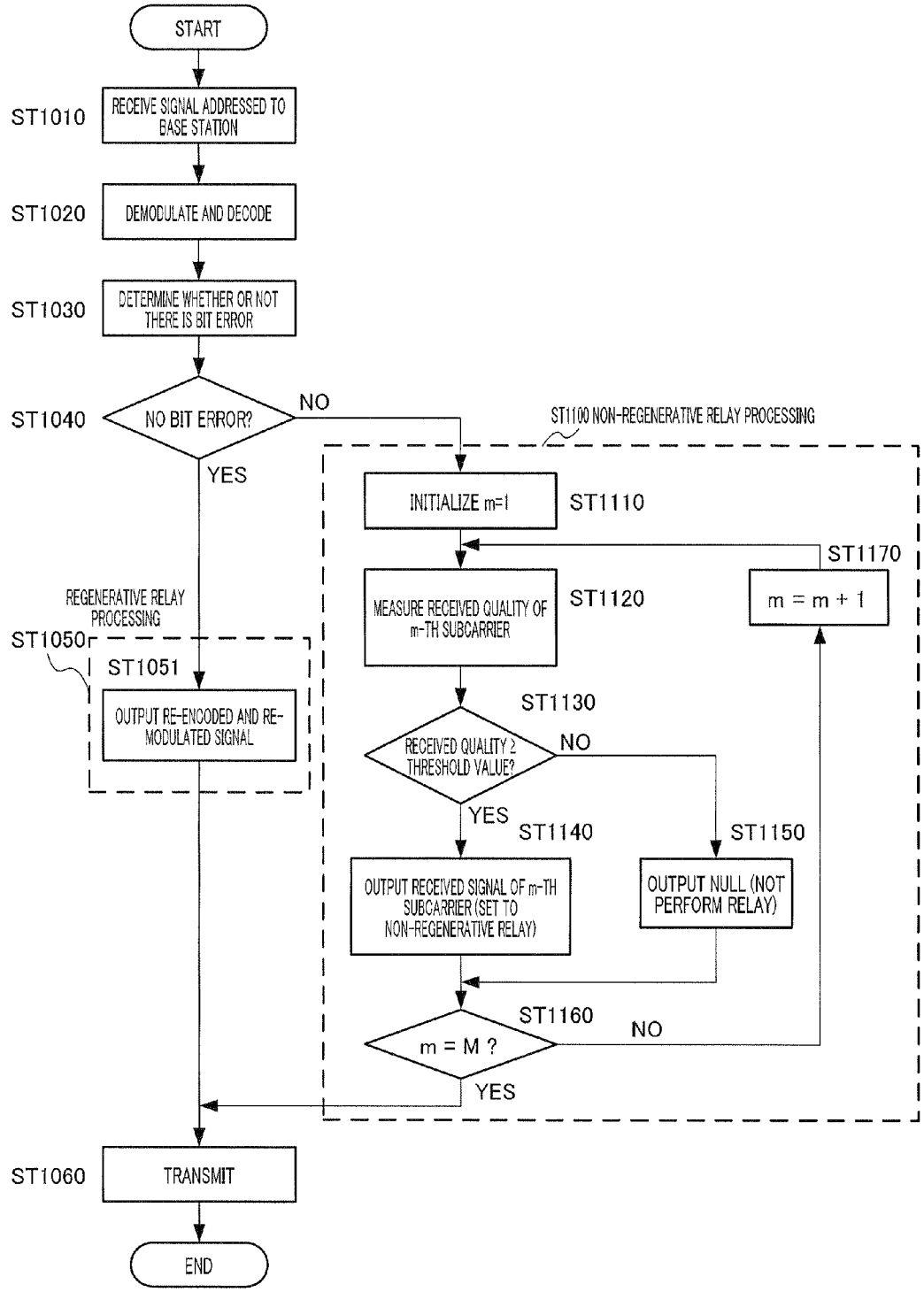
FIG. 3 is a flowchart illustrating specific operation steps of the communication relay apparatus according to Embodiment 1.

FIG. 3 is a flowchart showing specific operation steps of communication relay apparatus 100 having the above-described configuration.

Communication relay apparatus 100 receives the signal which is transmitted from mobile station MS1 and addressed to base station BS1 (ST1010), and performs OFDM demodulation processing, channel compensation processing, demodulation processing and decoding processing (error correction processing) (ST1020). Communication relay apparatus 100 determines whether or not there is a bit error (ST1030: hereinafter referred to as a "first received quality determination") for the bit streams subjected to error correction, performs regenerative relay processing when there is no bit error (ST1050), and performs non-regenerative relay processing when there is a bit error (ST1100). The signal subjected to either processing is transmitted from communication relay apparatus 100 (ST1060).

For example, when there is no bit error in ST1040, the symbol streams are outputted which are obtained by re-encoding and re-modulating the decoded bit streams as regenerative relay processing (ST1051).

On the other hand, when there is a bit error in ST1040, a second received quality determination is performed that compares received quality of each subcarrier with a predetermined threshold value (ST1120 to 1130). Hereinafter, the threshold value used in this second received quality determination is referred to as a "relay decision threshold value." When the received quality is equal to or higher than the relay decision threshold value, the received signal of that subcarrier is outputted (ST1140), and, when the received quality is lower than the relay decision threshold value, NULL is outputted instead of the received signal (ST1150). Here, "NULL" refers to information indicating that transmission is not performed, and, normally, a zero value is used. Therefore, in this case, the received signal of that subcarrier is not relayed. Here, m is a number sequentially allocated to each subcarrier, that is, a subcarrier number (m=1, 2, ..., M), and M ($\geq$1) is the total number of subcarriers. Further, subcarrier number m is incremented from 1 to M in ST1110, ST1160 and ST1170, and the above-described processing is performed for each subcarrier.

In this way, communication relay apparatus 100 performs first and second received quality determination on the received signal, and, depending on those results, selects one of a regenerative relay, non-regenerative relay and relay cancellation. Furthermore, the second received quality determination is performed per subcarrier.

Here, a regenerative relay refers to relay processing of regenerating received binary data to real data, that is, regenerating the received signal to a state where the signal is meaningful as information, and then performing re-encoding, re-modulation and the like on the regenerated signal to generate a transmission signal and transferring the transmission signal. To be more specific, the regenerative relay refers to relay processing of, after decoding the received signal once and performing error correction according to circumstances, performing re-encoding and modulation and transferring the received signal. That is, decoding processing (and error correction processing according to circumstances) is performed in the middle of relay processing, and therefore, even if there are some errors in the received signal of the relay station, the reception errors are corrected at the relay station, and the received signal is relayed to the receiving station. Therefore, it is expected that the signal finally received at the receiving station has less reception error probability.

On the other hand, a non-regenerative relay refers to processing of applying only simple processing such as power amplification, filter processing and interference cancellation to the received signal and then transmitting the received signal, without regenerating the received bit streams by demodulating, decoding, correcting errors, and the like. That is, a non-regenerative relay refers to processing of performing physical layer level processing on the received signal and immediately performing transmission processing. Therefore, errors are not corrected at the relay station. Further, by removing processing of a non-physical layer such as an application layer, relay processing can be performed fast compared to a regenerative relay.

Figure 4:
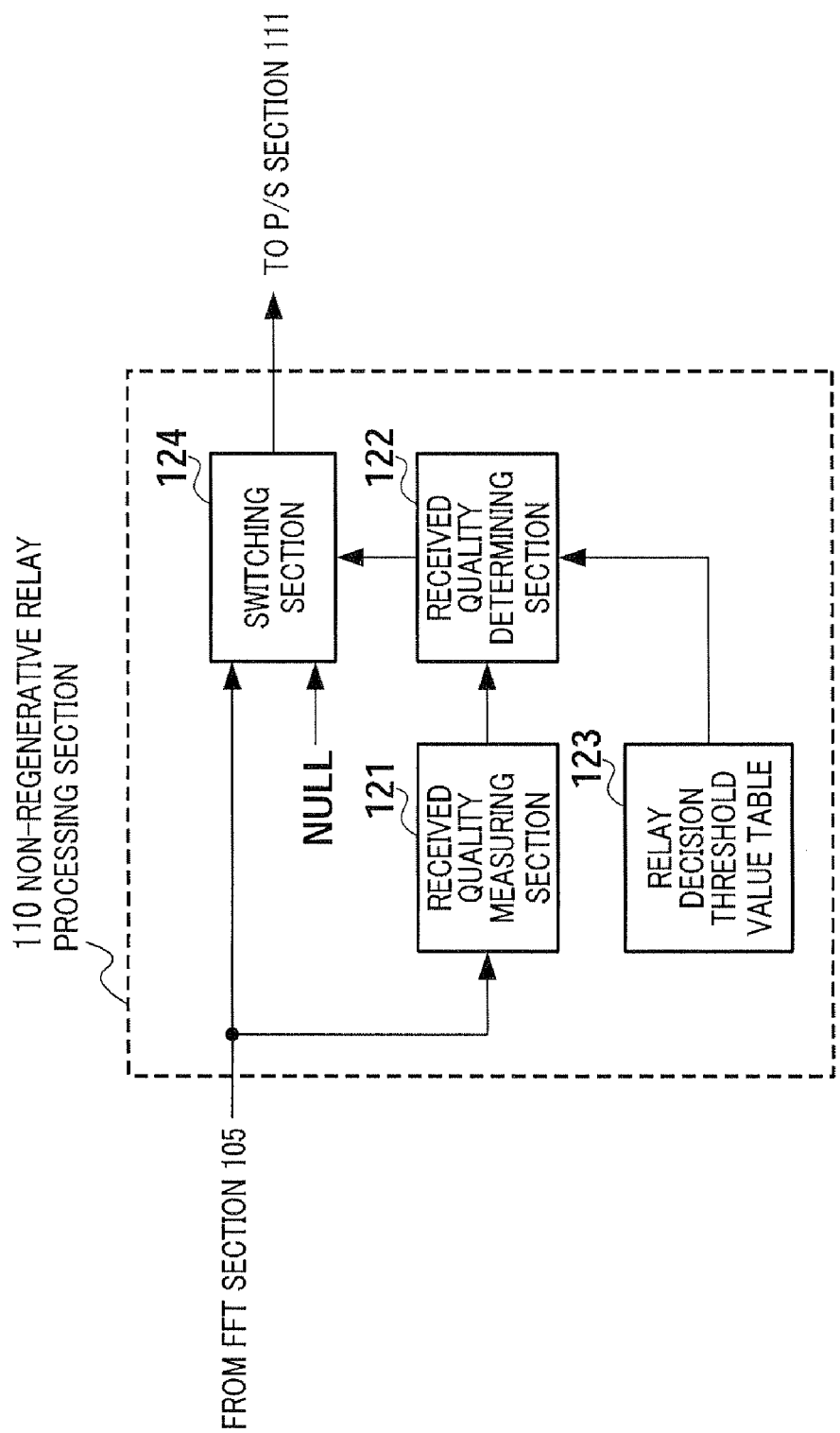
FIG. 4 is a block diagram showing the main internal configuration of a non-regenerative relay processing section according to Embodiment 1.

FIG. 4 is a block diagram showing the main internal configuration of above-described non-regenerative relay processing section 110.

Received quality measuring section 121 measures received quality such as the SIR (Signal to Interference Ratio), for example, from the pilot symbol of a given subcarrier or from the pilot symbol and data symbol of a given subcarrier, out of the received signal which is subjected to fast Fourier transform and outputted from FFT section 105. Received quality determining section 122 compares the received quality measured at received quality measuring section 121 with the relay decision threshold value outputted from relay decision threshold value table 123 and outputs a control signal to switching section 124 according to this comparison result. Switching section 124 switches between outputting the signal subjected to fast Fourier transform as is and outputting NULL, according to the control signal from received quality determining section 122. The output signal is outputted to P/S section 111.

Figure 5:
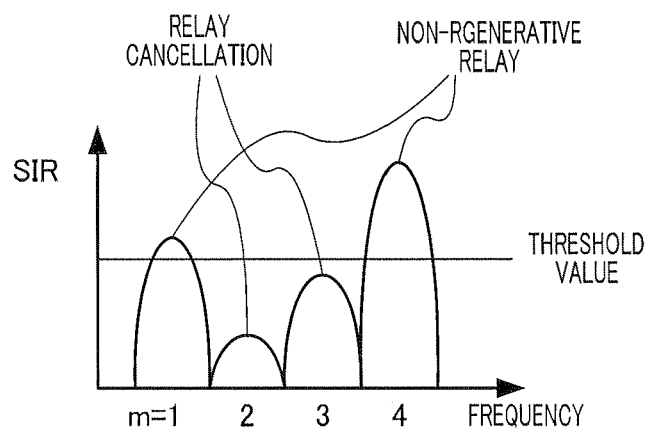
FIG. 5 shows an example of subcarrier signals selected as relay targets.

FIG. 5 shows an example of subcarrier signals selected as a relay target by above-described non-regenerative relay processing section 110. Here, a case is described as an example where the number of subcarriers is four.

As shown in this figure, the subcarriers received by communication relay apparatus 100 have different SIRs due to the influence of frequency selective fading. For example, the SIRs of subcarrier #1 and subcarrier #4 are higher than a threshold value, but the SIRs of subcarrier #2 and subcarrier #3 are lower than the threshold value. Therefore, in this case, non-regenerative relay processing section 110 makes subcarrier #1 and subcarrier #4 a relay target (target of non-regenerative relay processing) and determines to cancel the relay of subcarrier #2 and subcarrier #3. The relayed data is superimposed on subcarrier #1 and subcarrier #4.

Figure 6:
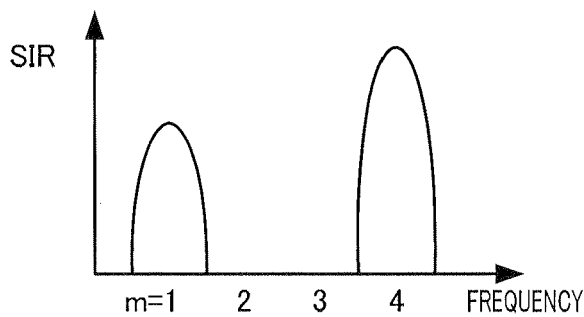
FIG. 6 shows the actually transmitted subcarrier signals.

FIG. 6 shows subcarrier signals actually transmitted from communication relay apparatus 100. As shown in this figure, only subcarrier #1 and subcarrier #4 are transmitted (relayed) to base station BS1.

Figure 7:
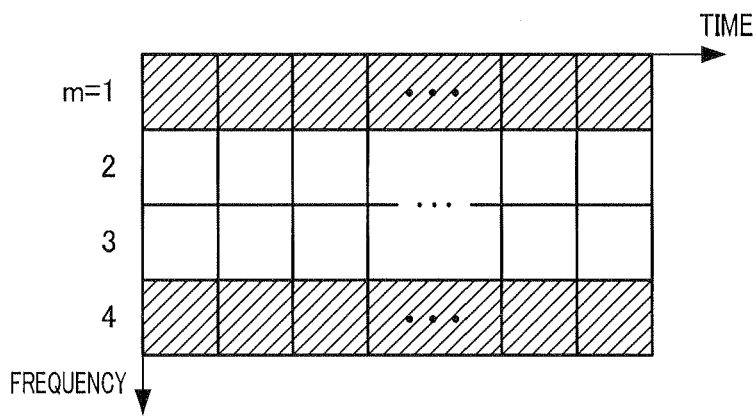
FIG. 7 shows frame configurations of the actually transmitted subcarrier signals.

FIG. 7 shows the frame configuration of the above actually transmitted subcarrier signals. The signals shown by shading indicate symbols where a non-regenerative relay is performed, and the other signals indicate symbols where a relay is canceled.

Figure 8:
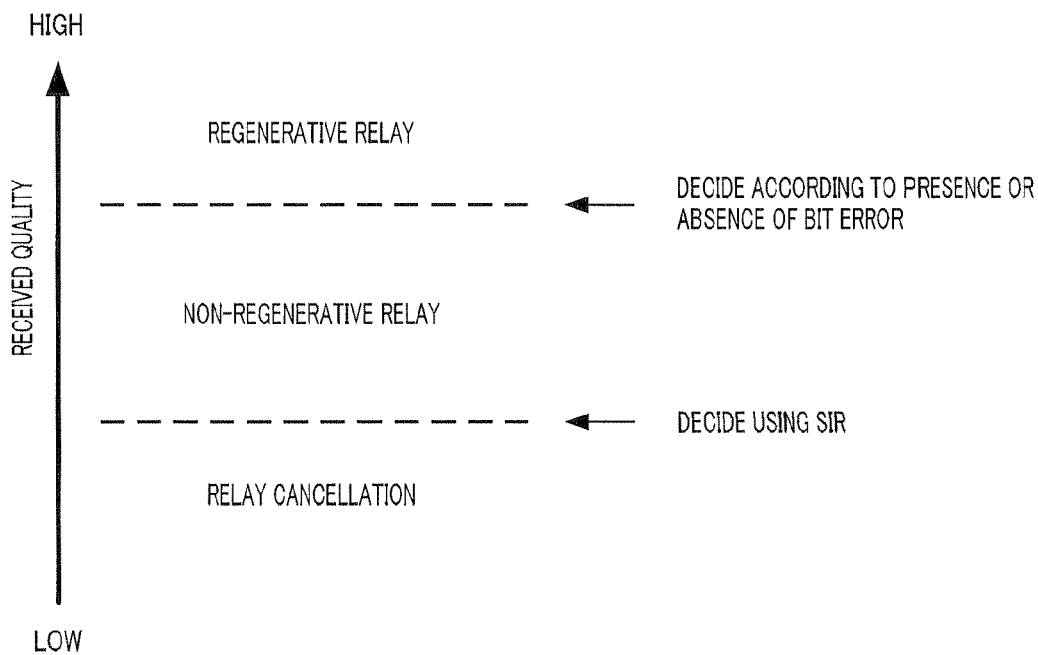
FIG. 8 illustrates a basic concept of a communication relay method according to Embodiment 1.

FIG. 8 illustrates the above-described communication relay method by communication relay apparatus 100, that is, a basic concept of the communication relay method according to this embodiment.

As shown in this figure, in this embodiment, received quality is evaluated using two criteria (specifically, two threshold values), and one of a regenerative relay, non-regenerative relay and relay cancellation is selected according to the level of received quality. To be more specific, when received quality is evaluated by bit errors, communication relay apparatus 100 selects one of a regenerative relay and non-regenerative relay according to the presence or absence of bit errors. Further, when received quality is evaluated using the SIR, communication relay apparatus 100 selects one of a non-regenerative relay and relay cancellation depending on whether or not the SIR is equal to or higher than the threshold value.

In this way, in this embodiment, a regenerative relay is performed when received quality is relatively good, a non-regenerative relay is performed when received quality is relatively poor, and the relay is canceled when received quality is much poorer. That is, in this embodiment, communication relay methods are switched according to received quality. In addition, bit errors and the SIR cannot be compared on the same coordinate axis originally, but, for ease of explanation, with the present invention, the bit errors and the SIR are indicated on the same coordinate axis.

Figure 9:
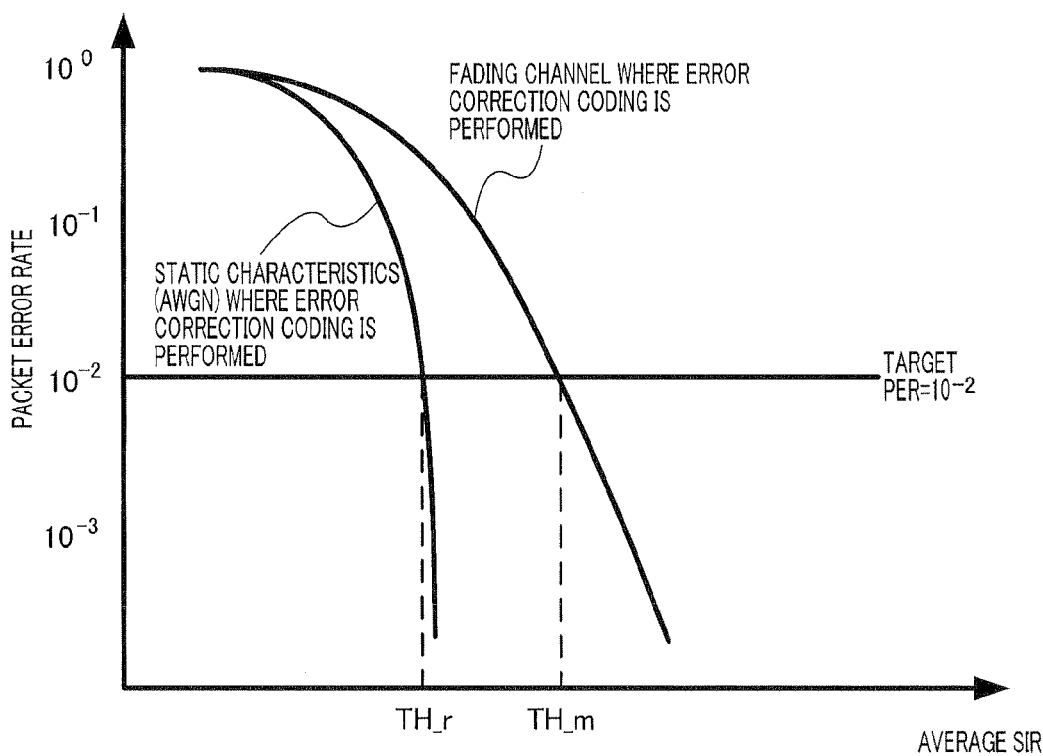
FIG. 9 illustrates a method for setting a relay decision threshold value.

FIG. 9 illustrates a method for setting the above-described relay decision threshold value.

This figure shows a relationship between the average SIR and the packet error rate when the signal subjected to error correction coding is received. There are two types of performance curves for the packet error rate (PER): one is a performance curve under a static (AWGN: Additive White Gaussian Noise) environment; and the other is a performance curve under a fading environment. Of these two performance curves, the relay decision threshold value is determined using the performance curve under the static environment. To be more specific, in this embodiment, TH_r, which is the intersection of the performance curve under the static environment and the target PER, is used as the relay decision threshold value. More preferably, the value (TH_r+β) obtained by adding predetermined margin β to TH_r, is used as the relay decision threshold value taking into consideration the SIR measurement error and the like.

In this way, in this embodiment, as the reference value for determining the relay decision threshold value, the PER characteristic when the packet error rate exhibits a static characteristic, is used.

Here, a case has been described where the relay decision threshold value is set based on performance curves. However, it is also possible to set the relay decision threshold value based on data table from which the same result can be obtained as the case of obtaining the relay decision threshold value based on performance curves.

Figure 10:
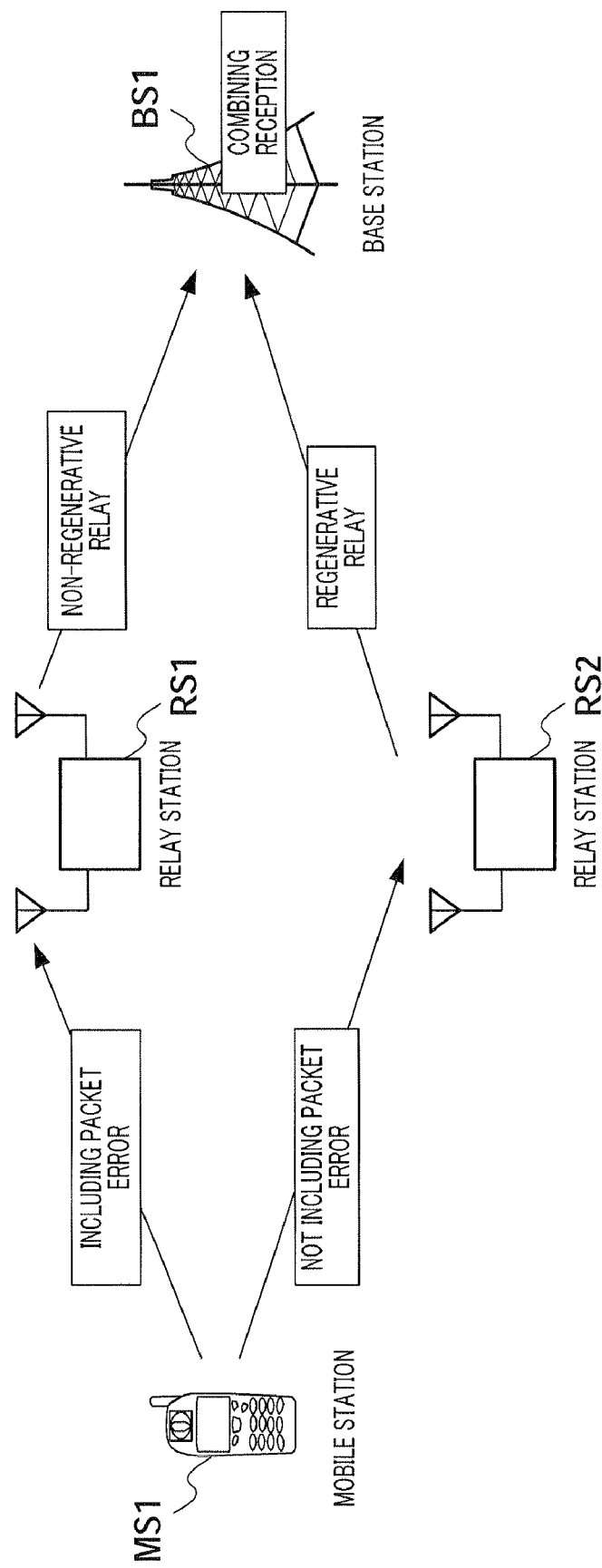
FIG. 10 shows a specific example where the communication relay method according to Embodiment 1 is applied to a communication system.
Figure 11:
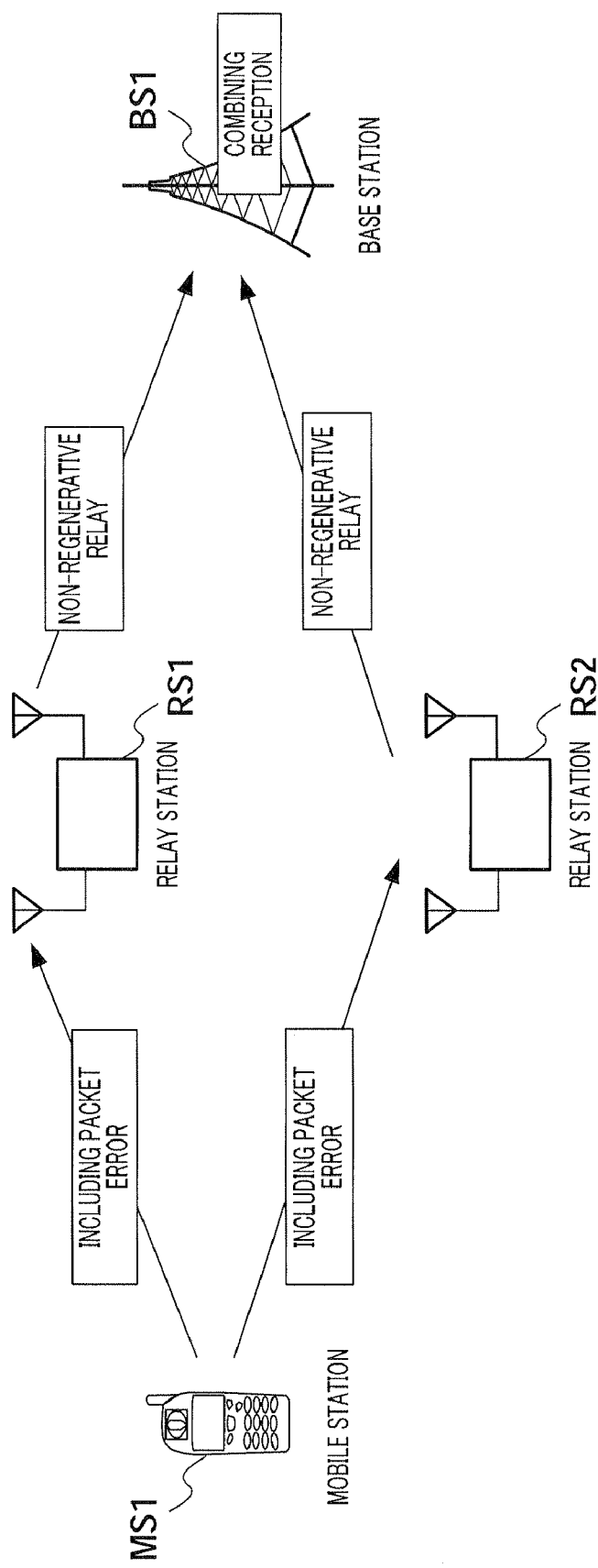
FIG. 11 shows another specific example where the communication relay method according to Embodiment 1 is applied to the communication system.

FIGS. 10 and 11 show a specific example where the communication relay method according to this embodiment is applied to the communication system. The basic condition is the same as FIG. 1.

In the example of FIG. 10, there is a packet error in the data received by relay station RS1 from mobile station MS1, and relay station RS1 selects a non-regenerative relay. There is no packet error in the data received by relay station RS2 from mobile station MS1, and relay station RS2 selects a regenerative relay. On the other hand, in the example of FIG. 11, there is a packet error in both the data received by relay station RS1 and the data received by relay station RS2, and both relay station RS1 and relay station RS2 select a non-regenerative relay. Base station BS1, which is the receiving station, performs reception combining on these relayed signals. The signals transmitted from the relay stations are physically the same radio signal even if a regenerative relay is performed or a non-regenerative relay is performed. Therefore, the receiving station can receive these relayed signals without distinguishing between the regenerative relayed signal and the non-regenerative relayed signal. By combining these signals, the receiving station can reduce the error rate of the received signal and improve the reception performance.

In addition, in the communication system according to this embodiment, when adaptive modulation and coding is applied, the method for determining the relay decision threshold value is as follows. This will be described with reference to FIG. 9 again.

The performance curves shown in FIG. 9 include, as described above, a performance curve under a static environment and a performance curve under a fading environment. The characteristics of these performance curves change depending on the MCS set (modulation scheme and coding rate) used in the communication system. Therefore, when the MCS set having the performance curves shown in FIG. 9 is particularly referred to as "MCS set #1," the performance curves of the packet error rate of MCS set #2, for example, are different from those shown in FIG. 9.

In the actual communication system, the influence of fading cannot be ignored. Therefore, to focus on the performance curve under the fading environment, as can be seen from FIG. 9, when communication is performed so that the average SIR of the received signal is higher than TH_m, the packet error rate of the received signal satisfies the target PER (required received quality). On the other hand, in the communication system where adaptive modulation is adopted, the MCS set used by the transmitting apparatus is determined based on the average SIR of the receiving apparatus. That is, when the average SIR of the signal actually received by the receiving apparatus is lower than TH_m, the transmitting apparatus has to select an MCS set having stronger error robustness than MCS set #1. Therefore, TH_m must be a minimum value of the average SIR when MCS set #1 is used.

As described above, different performance curves can be obtained depending on MCS sets, and TH_m is determined based on performance curves, so that a plurality of TH_m are determined for a plurality of MCS sets. Therefore, the minimum value of the average SIR when each MCS set is selected is obtained, so that the SIR applying range of each MCS set is naturally determined.

When the estimation error or the like of the SIR is taken into consideration, the SIR applying range is determined using the value (TH_m+α) obtained by adding predetermined margin α to TH_m.

As a relay decision threshold value, as described above, the value (TH_r+β) is used which is obtained by adding predetermined margin β to TH_r, that is the intersection of the packet error rate under the static environment and the target PER. There are a plurality of values of (TH_r+β) according to a plurality of MCS sets.

FIG. 12 shows the content of relay decision threshold value table 123 provided by non-regenerative relay processing section 110. A case will be described here as an example where adaptive modulation is applied.

Relay decision threshold value table 123 records SIR applying ranges of the MCS sets and relay decision threshold values corresponding to the MCS sets. Communication relay apparatus 100 measures an average SIR value [dB] of the received signal and selects an optimum MCS set corresponding to the average SIR value by referring to this table. When the optimum MCS set (for example, MCS set #5) is selected, non-regenerative relay processing section 110 reads out relay decision threshold value 18+β [dB] corresponding to MCS set #5 as a relay decision threshold value from relay decision threshold value table 123 and uses the value.

Here, the relay decision threshold value is TH_r+β. This β is an offset and is a value taking into consideration the SIR measurement error and the like. This offset value β may be a constant set in advance or a variable dynamically indicated from base station BS1.

Further, here, a case has been described as an example where the same offset β is set for all MCS sets. However, it is also possible to use the optimized values for the MCS sets. That is, the offset may be set taking into consideration the influence caused by the SIR measurement error of each MCS set. Normally, the value of β is set larger when the M-ary number of a modulation scheme is larger or when the coding rate is higher (in the example of FIG. 12, when the MCS set value is larger).

In this way, according to this embodiment, communication relay apparatus 100 decides, using two criteria, whether to perform a regenerative relay or non-regenerative relay on the relay packet received from the relay requesting station. To be more specific, communication relay apparatus 100 performs bit error determination as a first received quality determination, and performs a regenerative relay when there is no bit error, and proceeds to a second received quality determination when there is a bit error. Next, communication relay apparatus 100 performs a threshold decision on received quality such as the SIR per subchannel as a second received quality determination, and performs a non-regenerative relay on a subcarrier signal having received quality equal to or higher than the threshold value, that is, on a subcarrier with good received quality. On the other hand, the receiving station receives the regenerative relayed signals or non-regenerative relayed signals from one or a plurality of relay stations and combines these signals. At the receiving station, as described above, it is possible to perform reception processing without distinguishing between the regenerative relayed signal and the non-regenerative relayed signal. Therefore, the receiving station can improve the received quality by improving error rate performance and improve data throughput.

Further, according to this embodiment, when subcarriers are received at the relay station, at least a subcarrier having received quality equal to or higher than a predetermined level becomes a relay target. In other words, at the relay station, when there is no bit error in the received signal, that is, to focus on the whole of the received signal and the received quality is good, a regenerative relay is performed, and the whole of the received signal becomes a relay target. However, when a bit error is detected at the relay station, that is, the received quality of the whole of the received signal is not good, the received quality of the received signal is determined in subcarrier units, and a subcarrier having good quality is made a relay target by performing a non-regenerative relay. On the other hand, a subcarrier which is decided to have poor received quality again in this decision is not relayed. Therefore, the receiving station does not need to receive subcarriers having extremely poor received quality. Therefore, in combining processing at the receiving station, it is possible to prevent a subcarrier having poor received quality from being combined with a subcarrier having good received quality. That is, the error rate performance at the receiving station is improved. Further, power consumption of the relay station can be reduced.

Further, according to this embodiment, regardless of regenerative relay or non-regenerative relay, when a relay is performed via a plurality of relay stations, that is, when a cooperative relay is performed, space diversity gain can be obtained per subcarrier, so that it is possible to improve the error rate performance and received quality.

Further, according to this embodiment, a subcarrier having poor received quality—a subcarrier where an error rate is little improved—is removed from the relay targets. Therefore, the relay targets can be reduced, so that it is possible to reduce the interference power against adjacent cells.

Further, according to this embodiment, an efficient relay can be performed, so that it is possible to reduce the transmission power of the relay station and the number of relay stations. Therefore, it is possible to reduce the interference power and prevent the overall throughput of the communication system from decreasing.

Further, according to this embodiment, it is possible to set a lower relay decision threshold value than the case where only one of a regenerative relay and non-regenerative relay is performed or a relay is performed using only one relay station. Therefore, it is possible to reduce subcarriers that are not relayed by any relay station and reduce deterioration of the error rate.

Further, the relay station according to this embodiment autonomously determines the relay method according to received quality. Therefore, the upper station such as a base station does not specify a relay method, and the relay stations do not contact with each other. Accordingly, it is possible to perform relay processing promptly.

In addition, this embodiment may also be modified, and a relay decision threshold value may be changed according to the number of relay stations that perform a cooperative relay. To be more specific, the relay decision threshold value is set higher when the number of relay stations is larger and set lower when the number of relay stations is smaller. For example, offset value β for the relay decision threshold value may be set lower when the number of relay stations is smaller and set higher when the number of relay stations is larger.

FIG. 13 shows a relationship between the number of relay stations and offset β set according to the number of relay stations. Here, a case is assumed where MCS set #4 in FIG. 9 is used, that is, the modulation scheme is 16QAM and coding rate R=3/4, TH_r=13 dB.

For example, the number of subcarriers removed from the relay targets become larger when the number of relay stations is larger. Therefore, as shown in this figure, when the number of relay stations is small, a low relay decision threshold value is set in order to eliminate subcarriers that are not relayed by any relay station. On the other hand, when the number of relay stations is large, a high relay decision threshold value is set. Even if the relay decision threshold value is set in this way, the subcarriers are relayed from one or more relay stations. Further, to focus on one subcarrier, higher space diversity gain can be obtained when a relay is performed via a small number of relay stations having good received quality than a case where a relay is performed via a plurality of relay stations having poor received quality. The reason is that the signals relayed via the plurality of relay stations are subjected to noncoherent combining at an antenna end of the receiving station, and diversity gain becomes low. Therefore, by adopting the above-described communication relay method, the received quality of subcarriers of the relay targets is improved, throughput is improved, and transmission power is set low, so that it is possible to reduce interference against adjacent cells.

Further, in this embodiment, a case has been described as an example where a bit error determination is performed using CRC in a first received quality determination. However, it is also possible to perform a bit error determination without using CRC. For example, it is also possible to perform an error determination using parity bits and use a determination method of comparing the actual received SIR with the required SIR for the M-ary number and a coding rate of symbol streams of the received signal and determining that there is a bit error when the received SIR is low.

Further, in this embodiment, a case has been described as an example where the first received quality determination is performed according to the presence or absence of a bit error. However, it is also possible to perform the first received quality determination depending on whether or not the bit error rate is equal to or higher than a predetermined level.

Further, in this embodiment, a case has been described as an example where the second received quality determination is performed per subcarrier. However, it is also possible to perform the second received quality determination per subcarrier group which is a group comprised of a plurality of subcarriers, instead of per subcarrier.

Further, in this embodiment, a case has been described as an example where an uplink relay is performed. However, the present invention can be applied to the case of a downlink relay where the base station transmits data to the mobile station located outside the cellular service area.

Furthermore, in this embodiment, a case has been described as an example where a plurality of channel compensating sections 106 and non-regenerative relay processing sections 110 are provided according to the subcarriers. However, it is also possible to provide a single channel compensating section 106 and a single non-regenerative relay processing section 110 and repeatedly use these sections a plurality of times and accommodate the subcarriers.

Embodiment 2

The communication relay apparatus according to Embodiment 2 of the present invention compares a subcarrier determined to have good received quality in relay determination with a hard decision threshold value. Then, the received symbol of a subcarrier having better received quality than the hard decision threshold value is subjected to a hard decision and re-modulation, and transferred.

The basic configuration of the communication relay apparatus according to this embodiment is the same as communication relay apparatus 100 described in Embodiment 1. Therefore, the same parts will not be described, and non-regenerative relay processing section 210 which is a different configuration from communication relay apparatus 100 will be described below.

Figure 14:
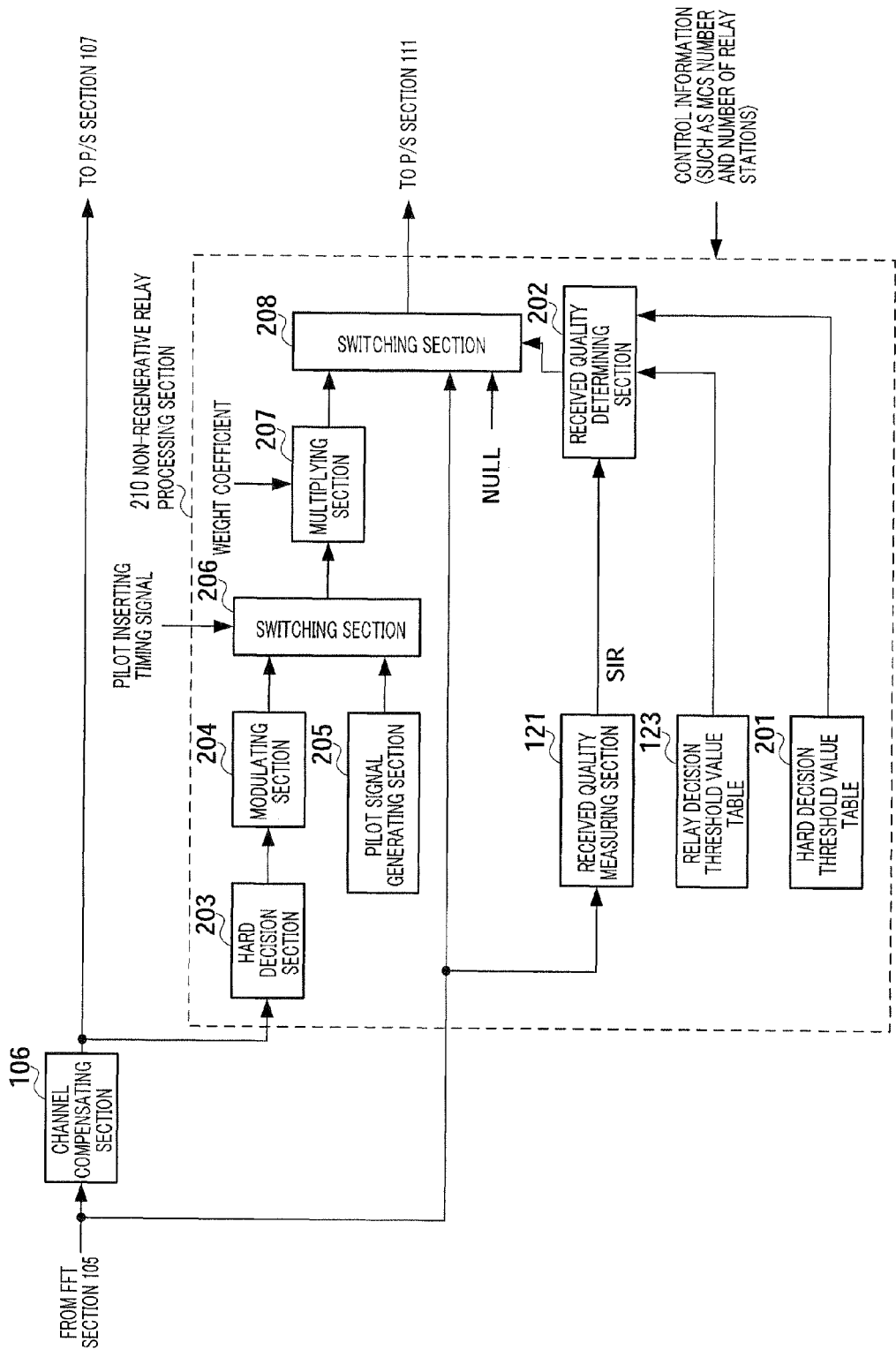
FIG. 14 is a block diagram showing the main internal configuration of a non-regenerative relay processing section according to Embodiment 2.

FIG. 14 is a block diagram showing the main internal configuration of non-regenerative relay processing section 210. The components that are the same as non-regenerative relay processing section 110 (refer to FIG. 4) described in Embodiment 1 will be assigned the same reference numerals without further explanations.

Non-regenerative relay processing section 210 is provided with a processing system (hard decision section 203 to multiplying section 207) that performs a hard decision on the output signal from channel compensating section 106.

Hard decision section 203 performs a hard decision on signal points of symbols from the received signal where phase fluctuation and the like is compensated at channel compensating section 106. Modulating section 204 performs modulation processing again on the bit streams outputted from hard decision section 203 and generates symbols. On the other hand, pilot signal generating section 205 generates pilot signals corresponding to subcarriers (pilot signals of subcarrier m) and outputs the pilot signals to switching section 206. Switching section 206 inserts (outputs) the pilot signals at pilot inserting timings according to the pilot inserting timing signal reported from a synchronizing section (not shown) and outputs the signals inputted from modulating section 204 at other timings. Multiplying section 207 assigns weights to the signals outputted from switching section 206 according to a weight coefficient for a hard decision output. The weight coefficient for a hard decision output is set such that the amplitude of this signal becomes larger than the amplitudes of other subcarrier signals subjected to a non-regenerative relay. For this weight coefficient for a hard decision output, a value set in advance, an amplitude fluctuation value of a channel obtained at channel compensating section 106 or a coefficient in proportion to the SIR measurement value is used.

On the other hand, received quality determining section 202 compares the SIR measurement value of subchannel m measured at received quality measuring section 121, with two threshold values of the relay decision threshold value outputted from relay decision threshold value table 123 and the hard decision threshold value outputted from hard decision threshold value table 201, and controls switching section 208 using a control signal according to the comparison result.

Switching section 208 switches among the output from multiplying section 207, the output from FFT section 105 and NULL according to the control information from received quality determining section 202.

Figure 15:
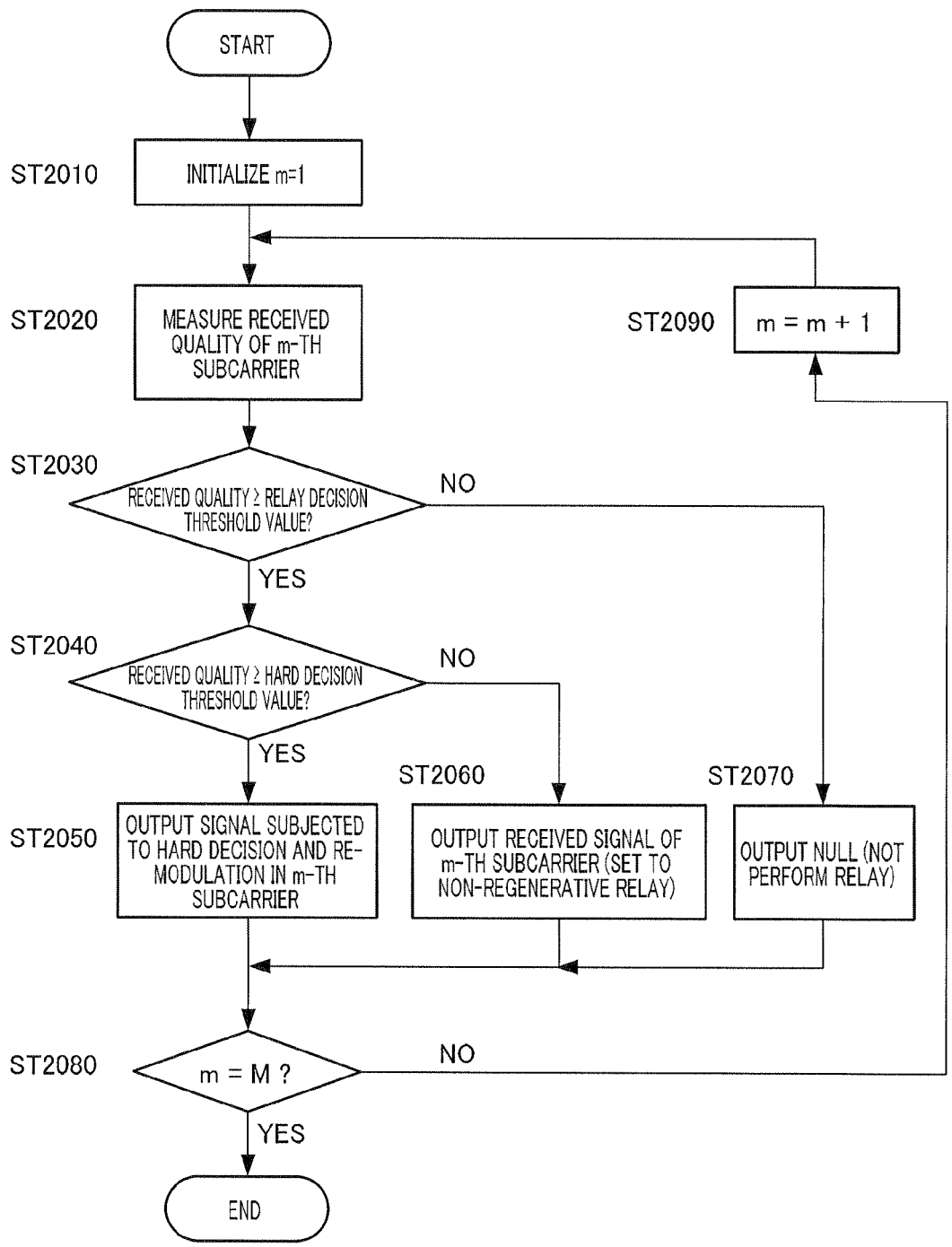
FIG. 15 is a flowchart showing steps of a communication relay method according to Embodiment 2.

FIG. 15 is a flowchart showing the steps of the communication relay method according to this embodiment. In addition, the communication relay method according to this embodiment is the same as the flow of the communication relay method described in Embodiment 1 (refer to FIG. 3) except ST1100, and therefore the overlapping parts will not be described. Therefore, FIG. 15 is a flowchart of processing after it is determined that there is a bit error (ST1040) in the first received quality determination (ST1030).

First, parameters indicating received quality such as the SIR measurement value of subcarrier m are compared with a relay decision threshold value (ST2020 and ST2030). When the received quality is equal to or higher than the relay decision threshold value, the received quality is further compared with a hard decision threshold value (ST2040). Then, when the received quality is equal to or higher than the hard decision threshold value, a hard decision is once performed, and the re-modulated symbol streams are outputted (ST2050). When the received quality is lower than the hard decision threshold value in ST2040, the received signal is outputted as is, that is, a non-regenerative relay is performed (ST2060). When the received quality is lower than the relay decision threshold value in ST2030, NULL is outputted instead of the received signal, and a relay is canceled (ST2070). In addition, in ST2010, ST2080 and ST2090, subcarrier number m is incremented from 1 to M, and the above-described processing is performed for each subcarrier in the same way as Embodiment 1.

Figure 16:
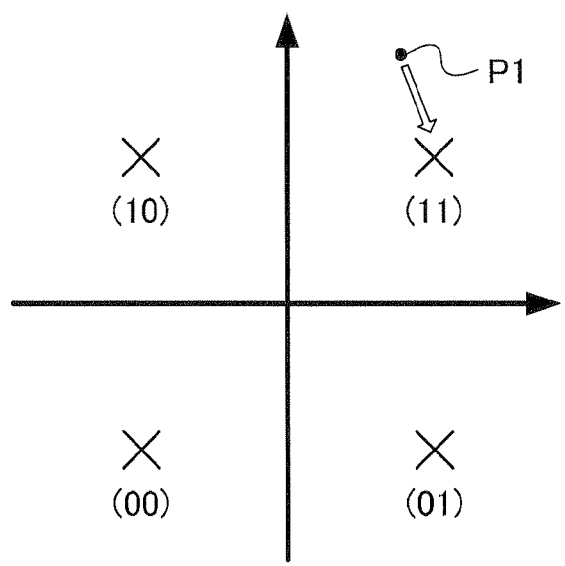
FIG. 16 illustrates change of a signal point by a hard decision.

FIG. 16 specifically illustrates how the signal point changes through the above-described hard decision by hard decision section 203. Here, a case will be described as an example where the modulation scheme is QPSK.

In this figure, cross signs ("x") indicate transmission candidate points based on QPSK, and P1 indicates a signal point of the received signal subjected to channel compensation. Hard decision section 203 selects the closest signal point by hard decision processing out of transmission candidate points from received symbol stream P1 where phase fluctuation and the like is compensated and converts the signal point to bit streams once. That is, received signal point P1 is converted to transmission candidate point (11) and outputted. The bit streams converted by the hard decision are re-modulated at modulating section 204 in symbol units.

Figure 17:
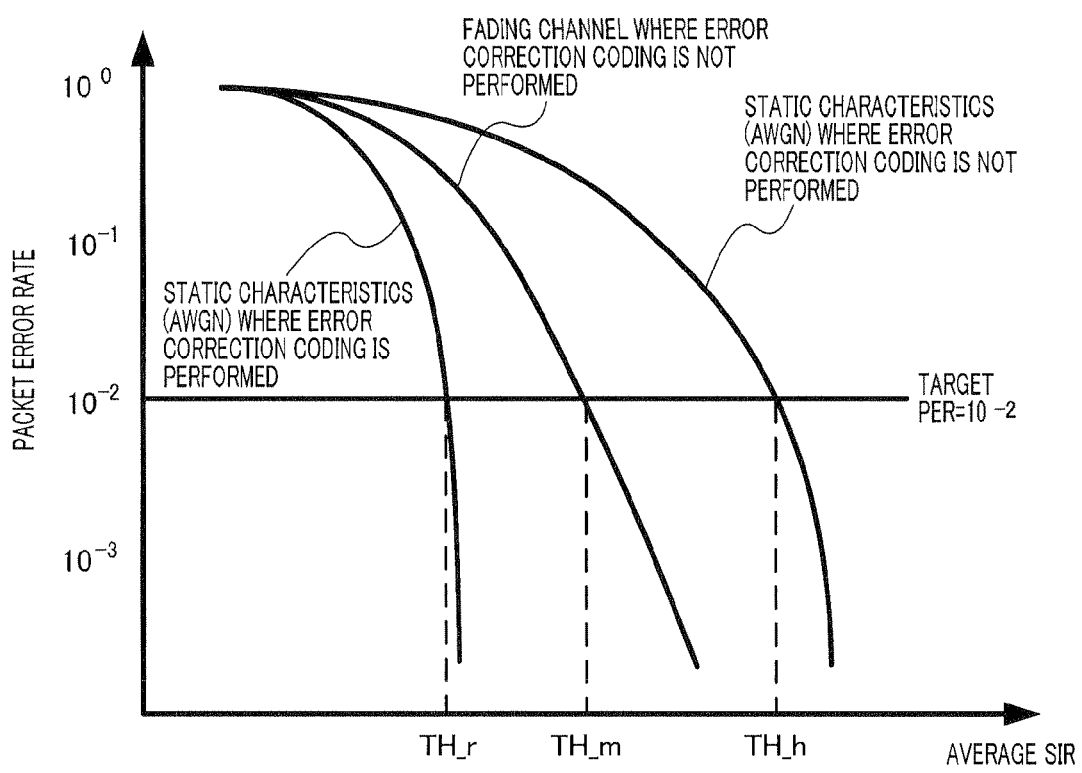
FIG. 17 illustrates a method of setting a hard decision threshold value.

FIG. 17 illustrates a method of setting the above-described hard decision threshold value.

In this figure, a performance curve under a static environment when error correction coding is not performed is further added to the two performance curves of the packet error rate described in Embodiment 1 (refer to FIG. 9).

In this embodiment, as a hard decision threshold value, TH_h is used, which is the intersection of the performance curve where error correction coding is not performed and the target PER. More preferably, the value (TH_h+γ) obtained by adding predetermined margin γ to TH_h, is used taking into consideration the SIR measurement error and the like.

By this means, a hard decision threshold value is determined by utilizing the PER characteristic under a static environment, where error correction coding is not performed, so that it is possible to reduce the decision error rate upon a hard decision and improve reliability of relayed signals.

Here, a case has been described as an example where the relay decision threshold value is set based on performance curves. However, it is also possible to set the relay decision threshold value based on a data table from which the same result can be obtained as the case of obtaining the relay decision threshold value based on performance curves.

Here, the PER performance under a static environment, where error correction coding is not performed, is utilized. However, it is also possible to determine hard decision threshold value TH_h using a required error rate upon the hard decision as a reference by utilizing the performance curve of BER (Bit Error Rate) under a static environment, where error correction coding is not performed.

FIG. 18 shows the content of relay decision threshold value table 123 and hard decision threshold value table 201 provided by non-regenerative relay processing section 210. Here, for ease of explanation, the contents of relay decision threshold value table 123 and hard decision threshold value table 201 are shown in one figure. Further, a case will be described here as an example where adaptive modulation is applied.

As shown in this figure, relay decision threshold values and hard decision threshold values corresponding to the MCS sets are set. Non-regenerative relay processing section 210 reads out a relay decision threshold value and a hard decision threshold value corresponding to the applied MCS set, from relay decision threshold value table 123 and hard decision threshold value table 201, respectively, and uses the threshold values.

In addition, offset γ of a hard decision threshold value is set taking into consideration the SIR measurement error and the like. This offset value γ may be a constant set in advance, or a variable dynamically specified from base station BS1.

Further, a case has been described where the same offset γ is set for all MCS sets, but it is also possible to use an optimized value for each MCS set. That is, it is also possible to set offset γ taking into consideration the influence caused by the SIR measurement error for each MCS set. Normally, the value of γ is set larger when the M-ary number of a modulation scheme is larger or when the coding rate is higher (in the example of FIG. 18, when the value of an MCS set is larger).

Figure 19:
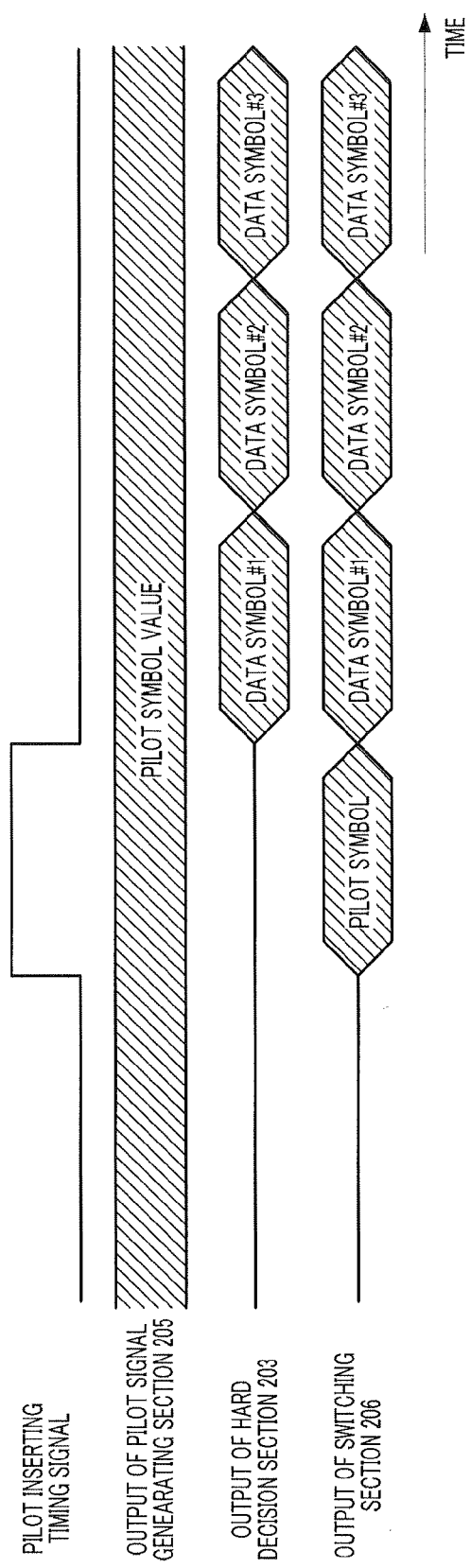
FIG. 19 illustrates specific operations of a switching section and its surroundings according to Embodiment 2.

FIG. 19 illustrates specific operations of switching section 206 and its surroundings.

Pilot signal generating section 205 continuously outputs pilot symbols. According to a pilot inserting timing signal, switching section 206 outputs the output signal from pilot signal generating section 205 (the same symbol as the pilot symbol inserted in the transmission signal by mobile station MS1 which is a relay requesting station) at a pilot inserting timing, and outputs the data symbols from hard decision section 203 outputted via modulating section 204 at timings other than the pilot inserting timing.

In this way, according to this embodiment, the subchannel determined to have good received quality is further compared with a hard decision threshold value, and only subcarriers having better received quality become targets of a hard decision and re-modulation. By this means, only subcarriers that can be subjected to a hard decision and have good received quality are subjected to a regenerative relay, so that it is possible to reduce noise components included in the relayed signal and further improve error rate performance at the receiving station.

Embodiment 3

In Embodiment 3 of the present invention, in a non-regenerative relay, the amplification factor of transmission power for subcarriers having poor received quality is set relatively higher than an amplification factor of transmission power for subcarriers having good received quality. By this means, it is possible to reduce the influence of interference against base station BS1, which is the receiving station.

The basic configuration of the communication relay apparatus according to this embodiment is the same as communication relay apparatus 100 described in Embodiment 1. Therefore, explanation of the same parts will be omitted, and the configuration of non-regenerative relay processing section 110 and its surroundings which is different from communication relay apparatus 100 will be described below.

Figure 20:
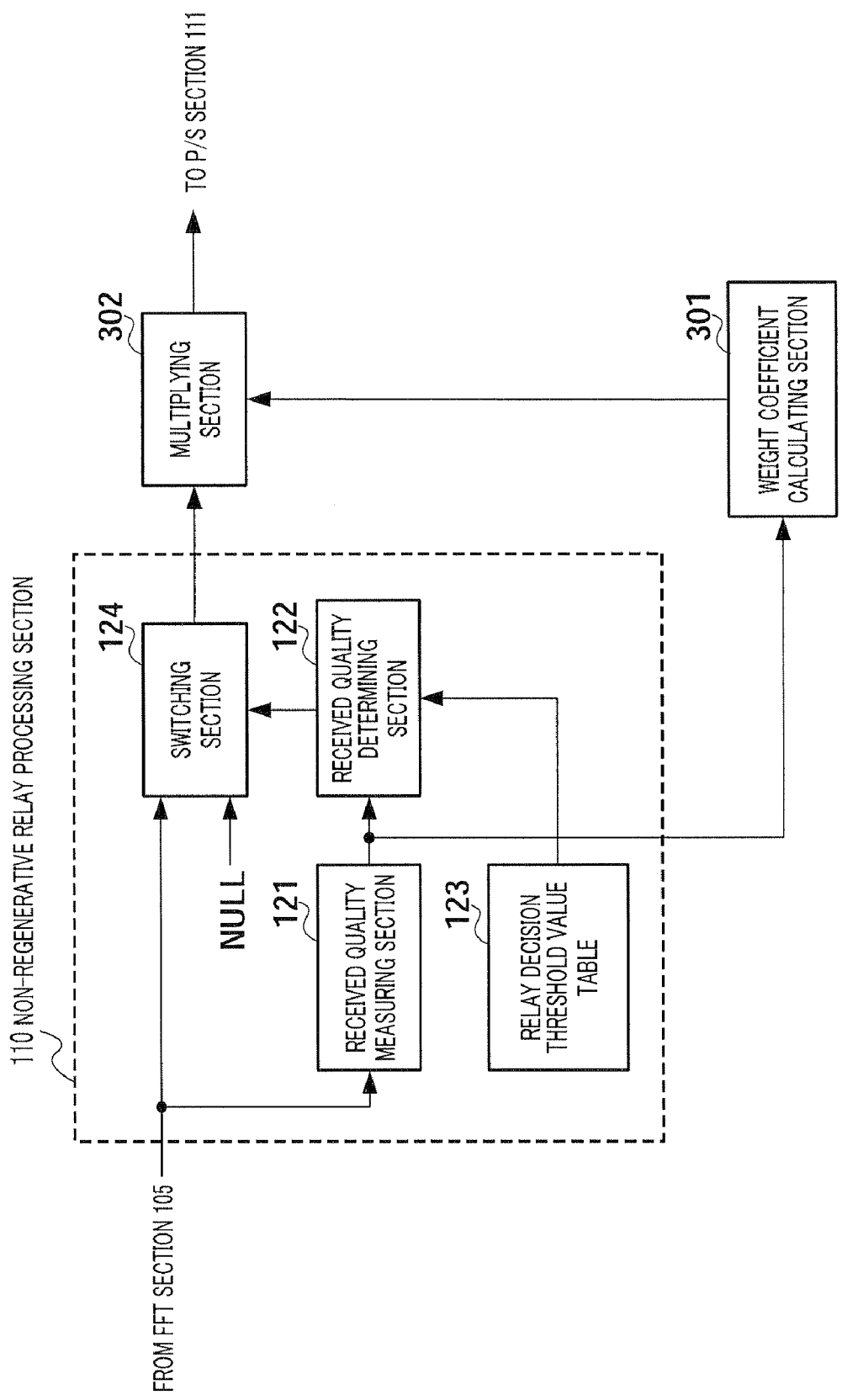
FIG. 20 is a block diagram showing a configuration of a non-regenerative relay processing section and its surroundings according to Embodiment 3.

FIG. 20 is a block diagram showing the configuration of non-regenerative relay processing section 110 and its surroundings.

Weight coefficient calculating section 301 calculates a weight coefficient which is in inverse proportion to the SIR measurement value of received quality measuring section 121 and outputs the calculated weight coefficient to multiplying section 302. Multiplying section 302 multiplies the relay symbol stream outputted from non-regenerative relay processing section 110 by the weight coefficient calculated at weight coefficient calculating section 301 and outputs the result to P/S section 111.

In this way, according to this embodiment, the amplification factor of transmission power in a non-regenerative relay is controlled in inverse proportion to received quality. That is, the amplification factor of transmission power is set higher for subcarriers having poorer received quality and set lower for subcarriers having better received quality. Therefore, subcarriers having poor received quality upon reception at the communication relay apparatus are relayed at a high transmission power amplification factor. Accordingly, it is possible to relatively reduce the interference power combined at a receiving antenna end of base station BS1, which is the receiving station, that is, the influence of interference against the receiving station.

Embodiment 4

In Embodiment 4 of the present invention, the communication relay method is changed according to packet types. The basic configuration of the communication relay apparatus according to this embodiment is the same as communication relay apparatus 100 described in Embodiment 1, and therefore explanation of the same configuration will be omitted, and the configuration of relay controlling section 402 and its surroundings (configuration similar to relay controlling section 154 described in Embodiment 1) which is a different configuration from Embodiment 1 will be described below.

Figure 21:
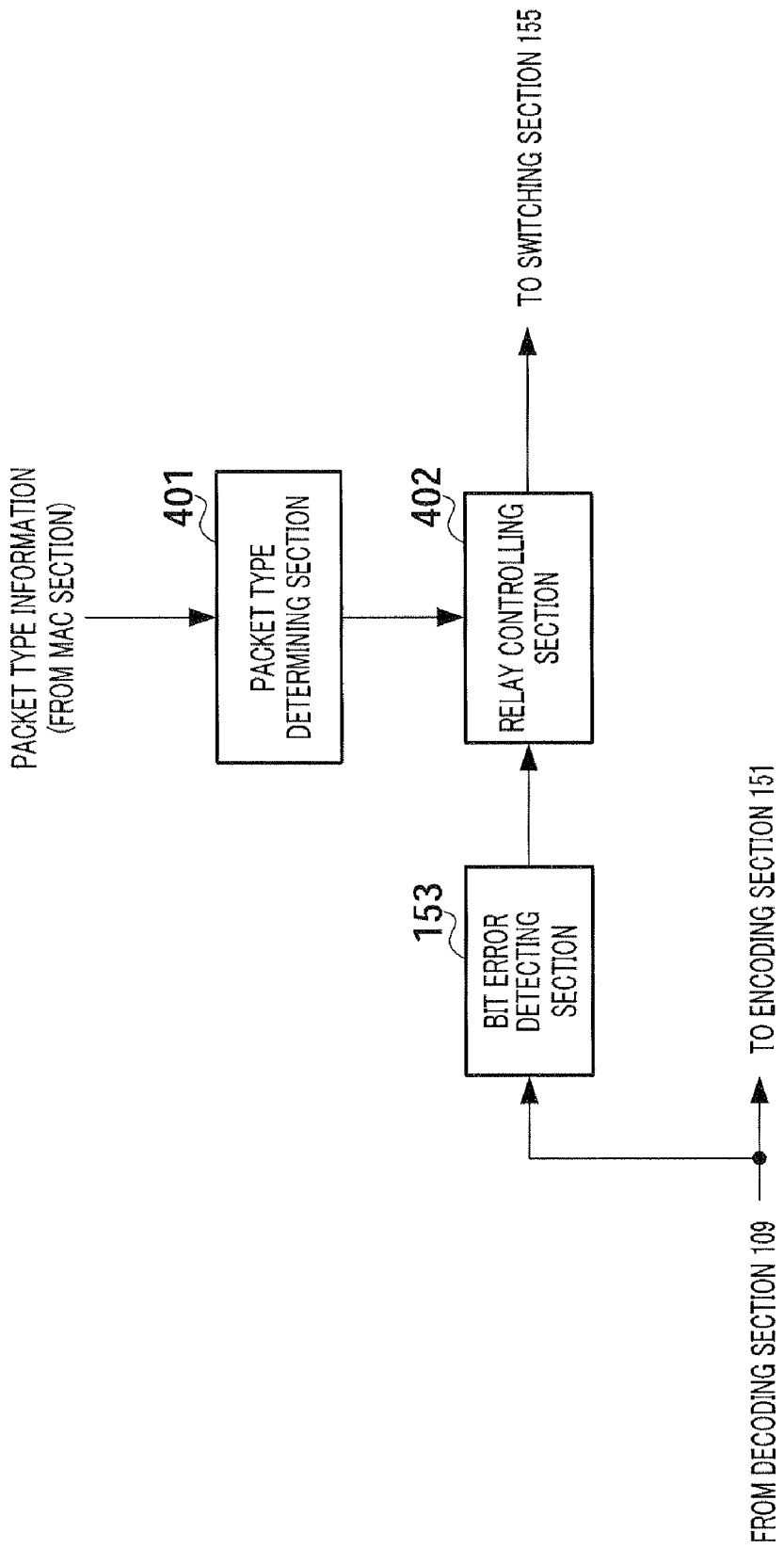
FIG. 21 is a block diagram showing the main configuration of a relay controlling section and its surroundings according to Embodiment 4.

FIG. 21 is a block diagram showing the main configuration of relay controlling section 402 and its surroundings. The components that are the same as those described in Embodiment 1 will be assigned the same reference numerals.

Packet type determining section 401 classifies present packets according to the packet type information acquired from higher layer such as a MAC (Media Access Control) section (not shown) and outputs control information indicating the classification result to relay controlling section 402.

Relay controlling section 402 controls switching section 155 based on the bit error detection result outputted from bit error detecting section 153 and the packet classification result outputted from packet type determining section 401 and changes the communication relay method.

Figure 22:
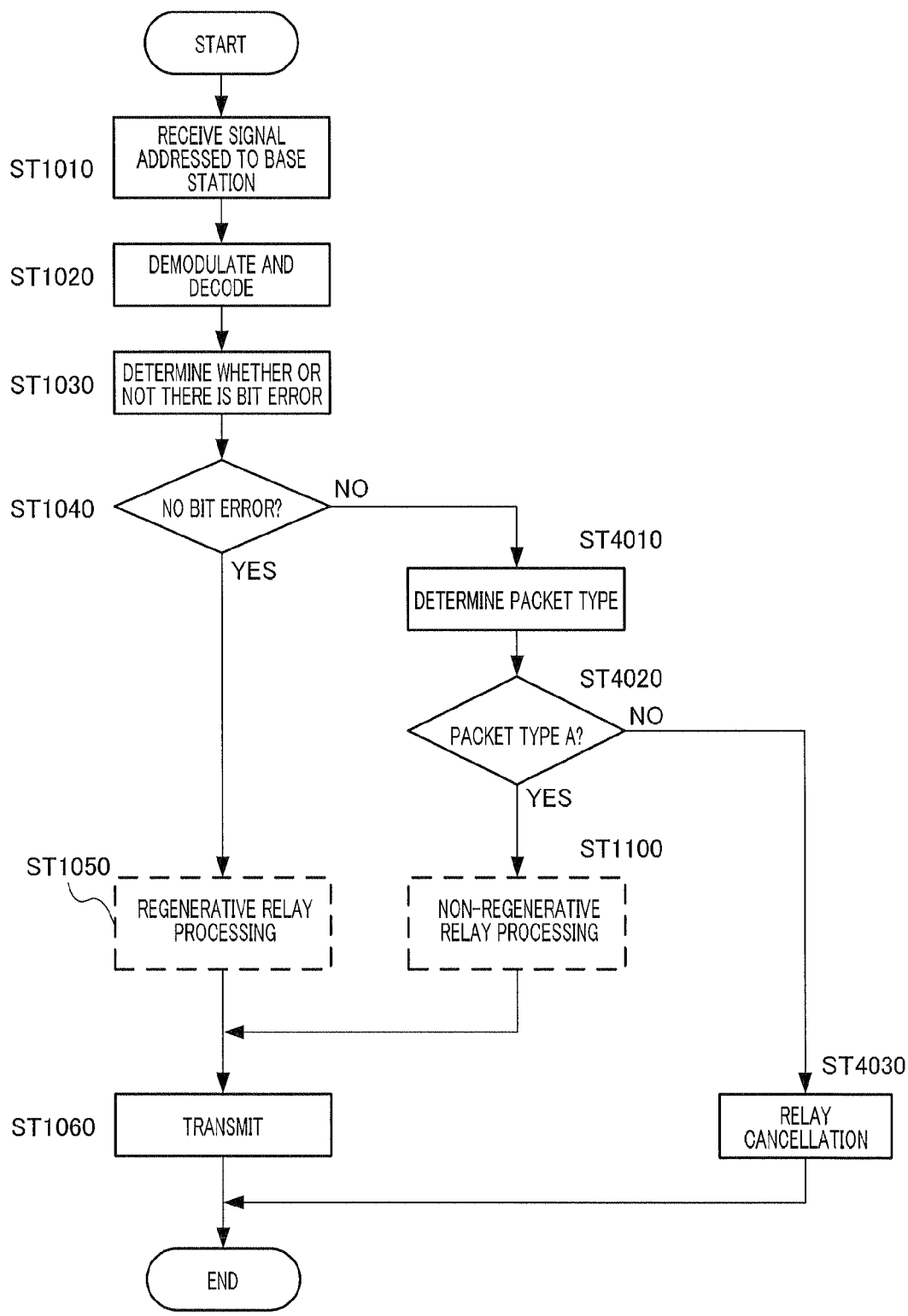
FIG. 22 is a flowchart showing steps of a communication relay method according to Embodiment 4.

FIG. 22 is a flowchart showing the steps of the communication relay method according to this embodiment. The steps of the communication relay method according to this embodiment are basically the same as the steps described in Embodiment 1 (refer to FIG. 3), and therefore the same steps will be assigned the same reference numerals without further explanations.

When it is determined that there is a bit error in ST1040, packet type determining section 401 determines whether the type of the present packet, which is presently received and becomes a target of anon-regenerative relay, is classified into type A (described later) or other types (hereinafter, described as "type B") (ST4010). When the present packet is classified into type A (ST4020), relay controlling section 402 controls switching section 155 and outputs the non-regenerative relayed signal outputted from P/S section 111 to S/P section 156 and performs a non-regenerative relay (ST1100). On the other hand, when the present packet is classified into type B in ST4020, relay controlling section 402 outputs NULL to switching section 155 and cancels a relay (ST4030).

FIG. 23 shows properties and specific examples of the packets classified into above-described type A.

Type A includes packets which belong to classification #1 to #3 shown in this figure, and, specifically, packets to which retransmission control such as ARQ is not applied, packets that allow little transmission delay time period and packets having a small data size. The communication relay apparatus according to this embodiment makes these packets a non-regenerative relay target.

On the other hand, the communication relay apparatus according to this embodiment cancels a relay of the packets of type B which do not belong to type A, that is, packets where errors are restored by retransmission control such as ARQ, packets that allow large transmission delay time period or packets having a large data size.

In this way, according to this embodiment, even when communication is relayed by a plurality of relay stations as in a cooperative relay, a non-regenerative relay is performed on specific packets alone, so that it is possible to reduce interference power against adjacent cells. This is because, although interference against the adjacent cells increases when a plurality of relay stations perform a relay, the packets of non-regenerative relay targets are limited by the above operation.

Further, the above-described packets, specifically, packets where errors are not likely to be restored by retransmission, packets having a strict delay request or packets having a small size of data are packets where communication system throughput is expected to substantially improve by improving a packet error rate. Therefore, according to this embodiment, it is possible to further improve communication system throughput.

In this embodiment, a case has been described as an example where type A includes classification #1 to #3. However, it is not necessary to always handle all classification #1 to #3 as type A. For example, it is also possible to take only classification #1 as type A, only classification #2 as type A, both classification #1 and #2 as type A, or other various combinations as type A.

Embodiments of the present invention have been described.

The communication relay apparatus and communication relay method according to the present invention are not limited to the above embodiments and can be implemented by making various modification. For example, the embodiments may be implemented in combination as appropriate.

The communication relay apparatus according to the present invention can be provided to a mobile station apparatus, base station apparatus, and the like in a mobile communication system, thereby providing a mobile station apparatus and the like having the same operation effect as described above.

Here, a case has been described as an example where an OFDM scheme is adopted as a communication scheme. However, the adopted communication scheme may be a multiple access scheme such as TDM (Time Division Multiplexing), FDM (Frequency Division Multiplexing) and SDM (Space Division Multiplexing).

Here, a case has been described as an example where communication is performed via a plurality of subcarriers. These subcarriers may correspond to a concept generally referred to as subchannels. For example, when the SDM (SDMA) scheme is adopted, subchannels are interpreted as substreams. When the CDM (CDMA) scheme is adopted, subchannels are interpreted as channels having different spreading codes. When the TDM (TDMA) scheme is adopted, subchannels are interpreted as time frames or time slots.

Here, a case has been described as an example where the SIR is used as received quality. However, it is also possible to use the CIR (Carrier to Interference Ratio), SINR (Signal to Interference and Noise Ratio), CINR (Carrier to Interference and Noise Ratio), and the like, as received quality. Further, in a communication system where interference power is not taken into consideration and only noise power needs to be taken into consideration, it is possible to use the SNR (Signal to Noise power Ratio) CNR (Carrier to Noise Ratio), received power, RSSI (Received Signal Strength Indicator), amplitude of the received signal, and the like, as received quality. Furthermore, it is possible to use the BER (Bit Error Rate), channel estimation value, and the like as a parameter according to received quality.

Here, a case has been described as an example where the communication relay apparatus according to the present invention is provided to a mobile station, the communication relay apparatus according to the present invention can be provided to a mobile communication terminal such as a notebook PC.

Here, a case has been described as an example where the present invention is implemented with hardware, but the present invention can be implemented with software. For example, by describing the communication relay method algorithm according to the present invention in a programming language, storing this program in a memory and making an information processing section execute this program, it is possible to implement the same function as the communication relay apparatus of the present invention.

Each function block employed in the description of each of the aforementioned embodiments may typically be implemented as an LSI constituted by an integrated circuit. These may be individual chips or partially or totally contained on a single chip.

"LSI" is adopted here but this may also be referred to as "IC", "system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2005-133720, filed on Apr. 28, 2005, the entire content of which is expressly incorporated by reference herein.

INDUSTRIAL APPLICABILITY

The communication relay apparatus and communication relay method according to the present invention can be applied to mobile station apparatuses and the like in a mobile communication system.

The invention claimed is:

1. A communication relay apparatus, comprising:
   a first determining section that determines a first received quality of a whole of a received signal comprising a plurality of elements;
   a first relay section that relays the whole of the received signal according to a first determination result of the first determining section;
   a second determining section that determines a second received quality of the received signal per element; and
   a second relay section that relays a specific element of the received signal according to a second determination result of the second determining section, wherein:
   when the first received quality is equal to or higher than a first predetermined level, the first relay section determines the received signal as a relay target; and
   the second relay section determines, as the relay target, an element out of the received signal which is not the relay target of the first relay section, the element having the second received quality equal to or higher than a second predetermined level.

2. The communication relay apparatus according to claim 1, wherein:
   the first relay section performs a regenerative relay of decoding, re-encoding and relaying the received signal; and
   the second relay section performs a non-regenerative relay of power-amplifying and relaying the received signal.

3. The communication relay apparatus according to claim 1, wherein:
   the first determining section uses, as the first received quality, a presence or an absence of one of a bit error and a packet error;
   the first relay section determines, as the relay target, the received signal which does not have the bit error or the packet error;
   the second determining section uses, as the second received quality, one of a signal to interference ratio, a signal to interference and noise ratio, a carrier to interference ratio, and a carrier to interference and noise ratio; and
   the second relay section determines, as the relay target, the element having the second received quality equal to or higher than a threshold value.

4. The communication relay apparatus according to claim 3, wherein the threshold value is set based on a required bit error rate or a required packet error rate when error correction coding is performed and static characteristics are exhibited.

5. The communication relay apparatus according to claim 4, wherein:
   the threshold value includes an offset; and
   the offset is set based on a number of communication relay apparatuses that actually perform a relay.

6. The communication relay apparatus according to claim 3, wherein:
the second determining section further compares the element, having the second received quality equal to or higher than the threshold value, with a hard decision threshold value; and
the second relay section performs a hard decision and a relay on the element having the second received quality equal to or higher than the hard decision threshold value.

7. The communication relay apparatus according to claim 6, wherein the hard decision threshold value is set based on a required bit error rate or a required packet error rate when error correction coding is not performed and static characteristics are exhibited.

8. The communication relay apparatus according to claim 1, wherein the second relay section sets transmission power of the specific element higher when the second received quality of the element is poorer.

9. The communication relay apparatus according to claim 1, wherein the second relay section limits the relay target according to a type of data that is mapped on the element, out of the element having the second received quality equal to or higher than the second predetermined level.

10. The communication relay apparatus according to claim 1, wherein one of subchannels, subcarriers, substreams, channels corresponding to spreading codes, time frames, and time slots is used as the element.

11. A communication terminal apparatus comprising the communication relay apparatus according to claim 1.

12. A base station apparatus comprising the communication relay apparatus according to claim 1.

13. A communication relay method, comprising:
determining by a relay apparatus a first received quality of a whole of a received signal comprising a plurality of elements;
relaying the whole of the received signal according to a result of the first received quality determination;
determining a second received quality of the received signal per element;
relaying a specific element of the received signal according to a result of the second received quality determination;
determining as a relay target the received signal when the first received quality is equal to or higher than a first predetermined level; and
determining as the relay target an element out of the received signal which is not the relay target, the element having the second received quality equal to or higher than a second predetermined level.

* * * * *